(12) United States Patent
Sun et al.

(10) Patent No.: US 11,924,516 B2
(45) Date of Patent: Mar. 5, 2024

(54) VIDEO INTERACTION METHOD AND APPARATUS, ELECTRONIC DEVICE, AND STORAGE MEDIUM

(71) Applicant: BEIJING ZITIAO NETWORK TECHNOLOGY CO., LTD., Beijing (CN)

(72) Inventors: Bo Sun, Beijing (CN); Mengwan Hu, Beijing (CN); Yuanxiang Ye, Beijing (CN); Xinjing Ye, Beijing (CN); Xiaoyi Qiu, Beijing (CN)

(73) Assignee: BEIJING ZITIAO NETWORK TECHNOLOGY CO, LTD. (CN)

( * ) Notice: Subject to any disclaimer, the term of this patent is extended or adjusted under 35 U.S.C. 154(b) by 0 days.

(21) Appl. No.: 18/148,561

(22) Filed: Dec. 30, 2022

(65) Prior Publication Data

US 2023/0144110 A1    May 11, 2023

Related U.S. Application Data

(63) Continuation of application No. PCT/CN2022/088729, filed on Apr. 24, 2022.

(30) Foreign Application Priority Data

Apr. 26, 2021 (CN) .......................... 202110456356.6

(51) Int. Cl.
*H04N 21/4784* (2011.01)
*H04N 21/472* (2011.01)

(52) U.S. Cl.
CPC ....... *H04N 21/4784* (2013.01); *H04N 21/472* (2013.01)

(58) Field of Classification Search
CPC ............. H04N 21/4784; H04N 21/472; H04N 21/44204

(Continued)

(56) References Cited

U.S. PATENT DOCUMENTS 9,123,197 B1    9/2015 Mayeroff et al.
10,586,223 B1 *    3/2020 Kloor ................... G06Q 20/085
(Continued)

FOREIGN PATENT DOCUMENTS

CN    109045705 A    12/2018
CN    109246441 A    1/2019
(Continued)

OTHER PUBLICATIONS

Cabeza-Ramírez LJ, Muñoz-Fernández GA, Santos-Roldán L. Video Game Streaming in Young People and Teenagers: Uptake, User Groups, Dangers, and Opportunities. Healthcare (Basel). Feb. 10, 2021;9(2):192. doi: 10.3390/healthcare9020192. PMID: 33578675; PMCID: PMC7916337. (Year: 2021).*

(Continued)

*Primary Examiner* — Cynthia M Fogg

(57) ABSTRACT

A video interaction method includes receiving a video posting operation for a first video, where the first video is a video shot by a first user by using a target prop, where the target prop is a preset type of shooting prop; in response to the video posting operation, posting the first video; in response to finishing posting the first video, acquiring information about the degree of completion of interaction between the first user and the target prop in the shooting process of the first video; determining a first target object corresponding to the first video according to information about the degree of completion of interaction; and paying the first target object to the account of the first user and displaying a first object information window of the first target object.

17 Claims, 10 Drawing Sheets

(58) Field of Classification Search
USPC .......................................................... 725/37
See application file for complete search history.

(56) References Cited

U.S. PATENT DOCUMENTS

| | | | | |
|---|---|---|---|---|
| 2008/0183804 | A1* | 7/2008 | Hassett | G06Q 30/02 709/203 |
| 2013/0219426 | A1* | 8/2013 | Zweig | G06Q 30/0251 725/32 |
| 2015/0193804 | A1* | 7/2015 | Liu | G06Q 30/0224 705/14.25 |
| 2016/0287987 | A1* | 10/2016 | Onda | G06F 16/7867 |
| 2018/0001216 | A1* | 1/2018 | Bruzzo | A63F 13/33 |
| 2019/0184283 | A1* | 6/2019 | Kim | A63F 13/35 |
| 2020/0197817 | A1* | 6/2020 | Chan | A63F 13/86 |
| 2021/0006715 | A1 | 1/2021 | Hao | |
| 2021/0365980 | A1* | 11/2021 | Hain | H04N 21/47815 |
| 2021/0366056 | A1* | 11/2021 | DiNunzio | G06Q 30/0208 |
| 2022/0239612 | A1* | 7/2022 | Wu | H04L 51/216 |
| 2022/0368980 | A1 | 11/2022 | Zhang | |
| 2022/0394343 | A1* | 12/2022 | Sun | H04N 21/41407 |

FOREIGN PATENT DOCUMENTS

| | | |
|---|---|---|
| CN | 109618190 A | 4/2019 |
| CN | 109688450 A | 4/2019 |
| CN | 110060101 A | 7/2019 |
| CN | 110225412 A | 9/2019 |
| CN | 110545442 A | 12/2019 |
| CN | 111405304 A | 7/2020 |
| CN | 111450538 A | 7/2020 |
| CN | 111629253 A | 9/2020 |
| CN | 111787415 A | 10/2020 |
| CN | 112019422 A | 12/2020 |
| CN | 112422998 A | 2/2021 |
| CN | 113179446 A | 7/2021 |
| JP | 2013059570 A | 4/2013 |
| JP | 2015058133 A | 3/2015 |
| JP | 2018157273 A | 10/2018 |
| JP | 2020089716 A * | 6/2020 |
| JP | 6748753 B1 | 9/2020 |

OTHER PUBLICATIONS

International Search Report dated Jun. 23, 2022 in International Application No. PCT/CN2022/088729, with English translation (5 pages).
Supplemental Search Report dated Apr. 19, 2022 in Chinese Patent Application No. 2021104563566, with English translation (6 pages).
Notice of Reasons for Refusal dated Sep. 19, 2023 in Japanese Patent Application No. 2023-509671, with English translation (6 pages).
Communication Pursuant to Article 94(3) EPC dated Jan. 4, 2024 in European Application No. 22794807.2 (135 pages).

* cited by examiner

VIDEO INTERACTION METHOD AND APPARATUS, ELECTRONIC DEVICE, AND STORAGE MEDIUM

CROSS REFERENCE TO RELATED APPLICATIONS

This is a Continuation Application of International Patent Application No. PCT/CN2022/088729, filed on Apr. 24, 2022, which is based on and claims priority to Chinese Patent Application No. 202110456356.6 filed with the China National Intellectual Property Administration (CNIPA) on Apr. 26, 2021, disclosures of which are incorporated herein by reference in their entireties.

TECHNICAL FIELD

The present disclosure relates to the field of interaction techniques, for example, a video interaction method and apparatus, an electronic device, and a storage medium.

BACKGROUND

In the related art, a video poster may use a shooting prop to shoot a video and post the video so that another user can view the video.

However, after the video is posted, the poster interacts with another user only by clicking, commenting on, or forwarding the video, involving a low level of interaction and thus resulting in a low willingness of the poster to create and post the video and a low willingness of another user to view the video.

SUMMARY

The present disclosure provides video interaction methods and apparatuses, an electronic device, and a storage medium to improve the level of interaction between a video poster and a video viewer.

The present disclosure provides a video interaction method. The method includes receiving a video posting operation for a first video, where the first video is a video shot by a first user by using a target prop, where the target prop is a preset type of shooting prop; in response to the video posting operation, posting the first video; in response to finishing posting the first video, acquiring information about the degree of completion of interaction between the first user and the target prop in the shooting process of the first video; determining a first target object corresponding to the first video according to information about the degree of completion of interaction; and paying the first target object to the account of the first user and displaying a first object information window of the first target object, where a second target object corresponding to the first video is used for being paid to the account of a second user after the first video is played by the user terminal of the second user.

The present disclosure also provides another video interaction method. The method includes displaying a video play page and playing a first video on the video play page, where the first video is a video shot by a first user by using a target prop and then posted by the first user, the target prop is a preset type of shooting prop, a first target object corresponding to the first video is used for being paid to the account of the first user when posting of the first video is finished, and the first target object is determined according to information about the degree of completion of interaction between the first user and the target prop in the shooting process of the first video; receiving a window display instruction for a second target object corresponding to the first video; in response to the window display instruction, displaying an acceptance window of the second target object; receiving a first trigger operation on an acceptance control in the acceptance window; and in response to the first trigger operation, paying the second target object to the account of a second user and displaying an object information window of the second target object.

The present disclosure also provides a video interaction apparatus. The apparatus includes a receiving module, a video posting module, an information acquisition module, an object determination module, and a payment module.

The receiving module is configured to receive a video posting operation for a first video, where the first video is a video shot by a first user by using a target prop, where the target prop is a preset type of shooting prop.

The video posting module is configured to, in response to the video posting operation, post the first video.

The information acquisition module is configured to, in response to finishing posting the first video, acquire information about the degree of completion of interaction between the first user and the target prop in the shooting process of the first video.

The object determination module is configured to determine a first target object corresponding to the first video according to information about the degree of completion of interaction.

The payment module is configured to pay the first target object to the account of the first user and display a first object information window of the first target object, where a second target object corresponding to the first video is used for being paid to the account of a second user after the first video is played by the user terminal of the second user.

The present disclosure also provides another video interaction apparatus. The apparatus includes a video play module, an instruction receiving module, an acceptance window display module, a receiving module, and a posting module.

The video play module is configured to display a video play page and play a first video on the video play page, where the first video is a video shot by a first user by using a target prop and then posted by the first user, the target prop is a preset type of shooting prop, a first target object corresponding to the first video is used for being paid to the account of the first user when posting of the first video is finished, and the first target object is determined according to information about the degree of completion of interaction between the first user and the target prop in the shooting process of the first video.

The instruction receiving module is configured to receive a window display instruction for a second target object corresponding to the first video.

The acceptance window display module is configured to, in response to the window display instruction, display an acceptance window of the second target object.

The receiving module is configured to receive a first trigger operation on an acceptance control in the acceptance window.

The payment module is configured to, in response to the first trigger operation, pay the second target object to the account of a second user and display an object information window of the second target object.

The present disclosure also provides an electronic device. The electronic device includes at least one processor and a memory configured to store at least one program.

The at least one processor is configured to perform any preceding video interaction method when executing the at least one program.

The present disclosure also provides a computer-readable storage medium. The storage medium stores a computer program which, when executed by a processor, causes the processor to perform any preceding video interaction method.

DETAILED DESCRIPTION

Embodiments of the present disclosure are described hereinafter with reference to the drawings. Although the drawings illustrate some embodiments of the present disclosure, the present disclosure may be implemented in various forms. These embodiments are provided for an understanding of the present disclosure. The drawings and embodiments of the present disclosure are only for illustrative purposes.

The various steps recited in method embodiments of the present disclosure may be performed in a different order and/or in parallel. Additionally, the method embodiments may include additional steps and/or omit the steps shown. The scope of the present disclosure is not limited in this respect.

The term "includes" or its variant used herein means "includes, but is not limited to". The term "based on" used herein means "at least partially based on". The term "an embodiment" used herein means "at least an embodiment". The term "another embodiment" used herein means "at least another embodiment". The term "some embodiments" used herein means "at least some embodiments". Related definitions of other terms are given in the description hereinafter.

Concepts such as "first" and "second" in the present disclosure are intended to distinguish between apparatuses, modules, or units and are not intended to limit the order of or interdependence between functions performed by these apparatuses, modules, or units.

References to modifications of "one" or "a plurality" mentioned in the present disclosure are intended to be illustrative and not limiting; those skilled in the art should understand that "one" or "a plurality" should be construed as "one or more" unless clearly expressed in the context.

The names of messages or information exchanged between apparatuses in embodiments of the present disclosure are illustrative and not to limit the scope of the messages or information.

Figure 1:
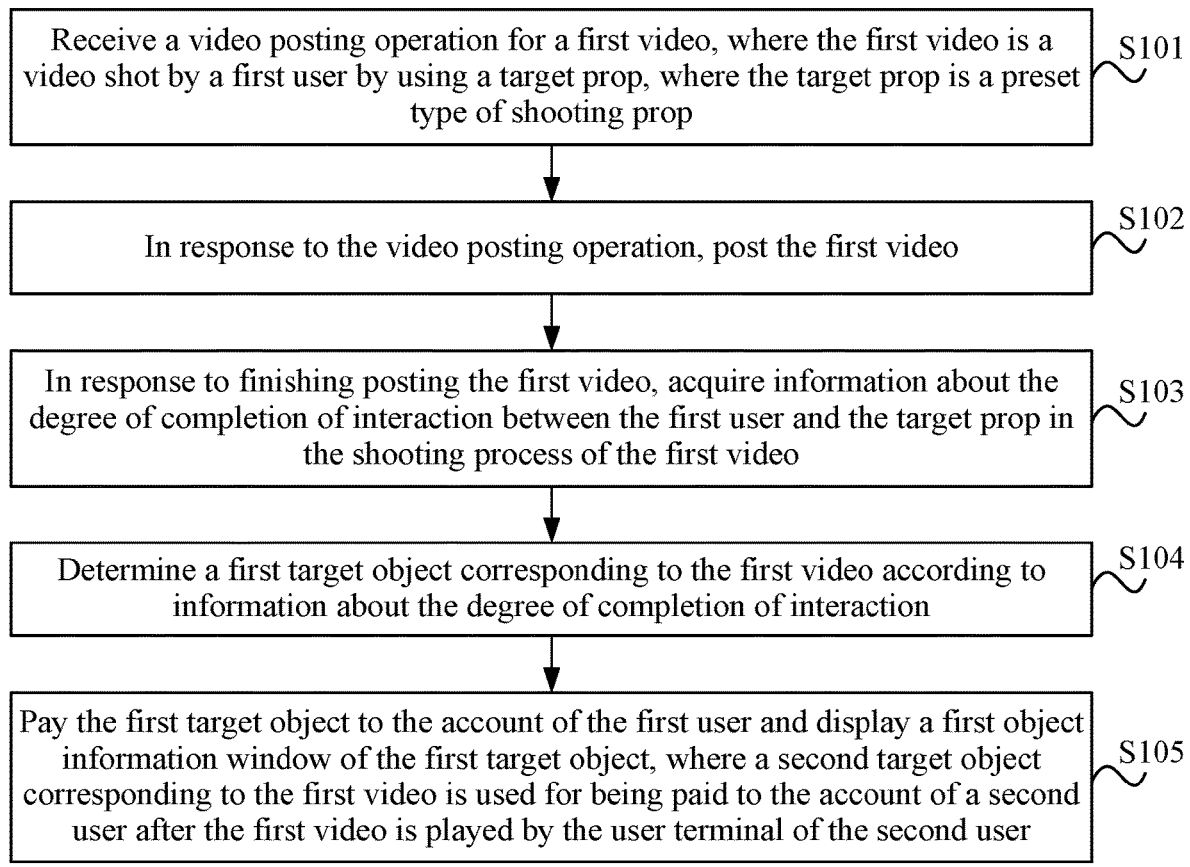
FIG. 1 is a flowchart of a video interaction method according to an embodiment of the present disclosure.

FIG. 1 is a flowchart of a video interaction method according to an embodiment of the present disclosure. The method may be performed by a video interaction apparatus. The apparatus may be implemented in software and/or hardware and may be configured in an electronic device such as a mobile phone or a tablet computer. The video interaction method of this embodiment of the present disclosure is applicable to the scenario where a video is shot and posted. As shown in FIG. 1, the video interaction method of this embodiment may include the process below.

In S101, a video posting operation for a first video is received, where the first video is a video shot by a first user by using a target prop, where the target prop is a preset type of shooting prop.

The first user may be a local user, that is, the user who shots and posts the first video. Accordingly, the video posting operation may be a trigger operation for instructing the electronic device to send the first video, for example, a click on a posting control on the posting page of the first video. The first video is a video shot by using a preset type of shooting prop (for example, a game-type shooting prop or another interactive shooting prop). The target prop is a preset type of shooting prop used by the first user to shoot the first video. Here the game-type shooting prop may be construed as a prop having the effect of game frames. When shooting a video using the preset type of shooting prop, the first user may shoot the video while performing interaction. The video content is a video of interactive frames of the first user. That is, the video frames may include both the prop effect of the preset type of shooting prop and frames shot by a camera.

After shooting the first video by using the target prop, the first user may perform a video posting operation to instruct the electronic device to post the first video. For example, the first user may click a first posting control on a video posting page to instruct the electronic device to post the first video as a video that is visible for only a preset duration (for example, one day or one week). Alternatively, the electronic device may click a "next" control on a video posting page to instruct the electronic device to switch the current display page from a video shooting page to the posting page of the first video and may click a second posting control on the posting page to instruct the electronic device to post the first video as a video that is visible for a long time.

In an embodiment, the first user may shoot the first video by using the target prop.

Illustratively, when wanting to shoot the first video by using the target prop, the first user may instruct the electronic device to display the video shooting page. For example, the first user may trigger a shooting control on a video play page or a shooting control of a shooting task on a task page to instruct the electronic device to display the shooting page and trigger a prop control on the video shooting page. Accordingly, when detecting that the first user triggers the prop control on the video shooting page, the electronic device may display a prop window. Then the first user may select the target prop in the prop window, click the shooting control on the video shooting page, and interact with the target prop in the shooting process. Accordingly, when detecting that the first user triggers the shooting control on the video shooting page, the electronic device may shoot special-effect frames containing the target prop and use the video shot when the first user interacts with the target prop as the first video.

Alternatively, when seeing a video shot by the target prop and wanting to check details about the target prop, the first user may trigger the prop anchor of the target prop on a video play page. Accordingly, when detecting that the first user clicks the prop anchor of the target prop, the electronic device may switch the current display page to the prop detail page of the target prop. When wanting to shoot a video by using the target prop, the first user may trigger a shooting control on the prop detail page. Accordingly, when detecting that the first user clicks the shooting control on the prop detail page, the electronic device may switch the current display page to the video shooting page; display, on the video shooting page, the effect corresponding to the target prop; shoot a prop special effect containing the target prop when detecting that the user triggers a shooting control on the video shooting page; and use the video shot when the first user interacts with the target prop as the first video.

In this embodiment, the first user may also instruct the electronic device to display the video shooting page by triggering a first shooting control in a second object information window of another video (such as a second video) or by triggering a second shooting control in an acceptance prompt window of a prop object corresponding to another video. In this case, before receiving the video posting operation for the first video, the method also includes receiving a trigger operation on a video shooting control, where the video shooting control includes at least one of a first shooting control in a second object information window or a second shooting control in an acceptance prompt window, the second object information window is displayed after the first user accepts a fourth target object corresponding to the second video, the acceptance prompt window is displayed when an acceptance operation performed for the fourth target object by the first user is received and an unaccepted fourth target object for the second video does not exist, and the second video is posted by a user other than the first user; and in response to the trigger operation, displaying a video shooting page to enable the first user to shoot the first video on the shooting page by using the target prop.

The second video may be a video shot and posted by a user other than the first user by using the preset type of shooting prop. The fourth target object may be construed as a reward for viewing the second video. The fourth target object may be a virtual item such as a bonus, a special effect, or accumulated points. The fourth target object may exist in the form of a red packet when the fourth target object is a bonus. The second object information window may be construed as an object information window of the fourth target object accepted by the first user. This window may display information such as the type and/or amount of the fourth target objects accepted by the first user. The first shooting control may be a shooting control located in the second object information window of the second video. The second shooting control may be a shooting control located in the acceptance prompt window of the second video.

Illustratively, the first user views the second video shot and posted by another user and accepts the fourth target object corresponding to the second video by performing the corresponding trigger operation. When detecting the first user's trigger operation for accepting the fourth target object corresponding to the second video, the electronic device determines whether the fourth target object corresponding to the second video has been paid to the first user (that is, whether the first user has accepted the fourth target object corresponding to the second video) and whether an unpaid fourth target object for the second video exists (that is, whether the fourth target objects corresponding to the second video have all been accepted). If the first user has accepted the fourth target object corresponding to the second video, the second object information window of the fourth target object accepted by the first user is displayed. If the first user has not accepted the fourth target object corresponding to the second video and if the fourth target object acceptable for the second video exists, the fourth target object may be paid to the account of the first user based on the acceptance operation of the first user, and the second object information window of the fourth target object accepted by the first user may be displayed. If the first user has not accepted the fourth target object corresponding to the second video and if the fourth target object acceptable for the second video does not exist, the acceptance prompt window may be displayed to indicate to the first user that the fourth target objects has all been accepted. Thus, when wanting to shoot a video, the first user may trigger the first shooting control in the second object information window of the fourth target object displayed by the electronic device or trigger the second shooting control in the acceptance prompt window of the fourth target object displayed by the electronic device. Accordingly, when detecting that the first user triggers the first shooting control or the second shooting control, the electronic device may switch the current display page from the video play page to the video shooting page to enable the first user to select the target prop and shoot the first video by using the target prop.

In S102, in response to the video posting operation, the first video is posted.

The second user may be any user (other than the first user) who views the first video, for example, a user who browses the first video on the video play page based on the video switching operation and/or a user who views the first video shared by the first user or another user. This is not limited to this embodiment. The second target object may be a reward for viewing the first video.

When receiving the video posting operation for the first video, in response to the video posting operation, the electronic device (for example, the user terminal of the first user) may upload the first video to the server and post the first video as, for example, a video that is visible for a preset duration or a video that is visible for a long time.

In S103, in response to finishing posting the first video, information about the degree of completion of interaction between the first user and the target prop in the shooting process of the first video is acquired.

In S104, a first target object corresponding to the first video is determined according to information about the degree of completion of interaction.

Information about the degree of completion of interaction may be construed as information about the degree of completion of interaction between the first user and the target prop during interaction. For example, when the target prop is a game-type shooting prop, information about the degree of completion of interaction may be the game score gained when the first user plays a game corresponding to the target prop.

When posting of the first video is finished, the electronic device may acquire information about the degree of completion of interaction between the first user and the target prop and determine object information of the first target object corresponding to the first video according to information about the degree of completion of interaction. Here the object information may be, for example, the type and/or amount of the first target object corresponding to the first video. When the degree of completion of interaction is high, a high-value-type target object and/or a large amount of target object may be selected to serve as the first target.

In S105, the first target object is paid to the account of the first user, and a first object information window of the first target object is displayed, where a second target object corresponding to the first video is used for being paid to the account of a second user after the first video is played by the user terminal of the second user.

The first target object may be a reward for posting the first video. The second target object may be a reward for viewing the first video. The first target object and/or the second target object may be a virtual item such as a bonus, a special effect, or accumulated points. The first object information window may be an information window of the first target object paid to the account of the first user. This information window may display object information of the first target object. Here the object information may be, for example, the type and/or amount of the first target object.

After the first target object is determined, the electronic device may pay the first target object to the account of the first user and display the first object information window of the first target object so that the first user can learn of the posting reward received by the first user.

Figure 2:
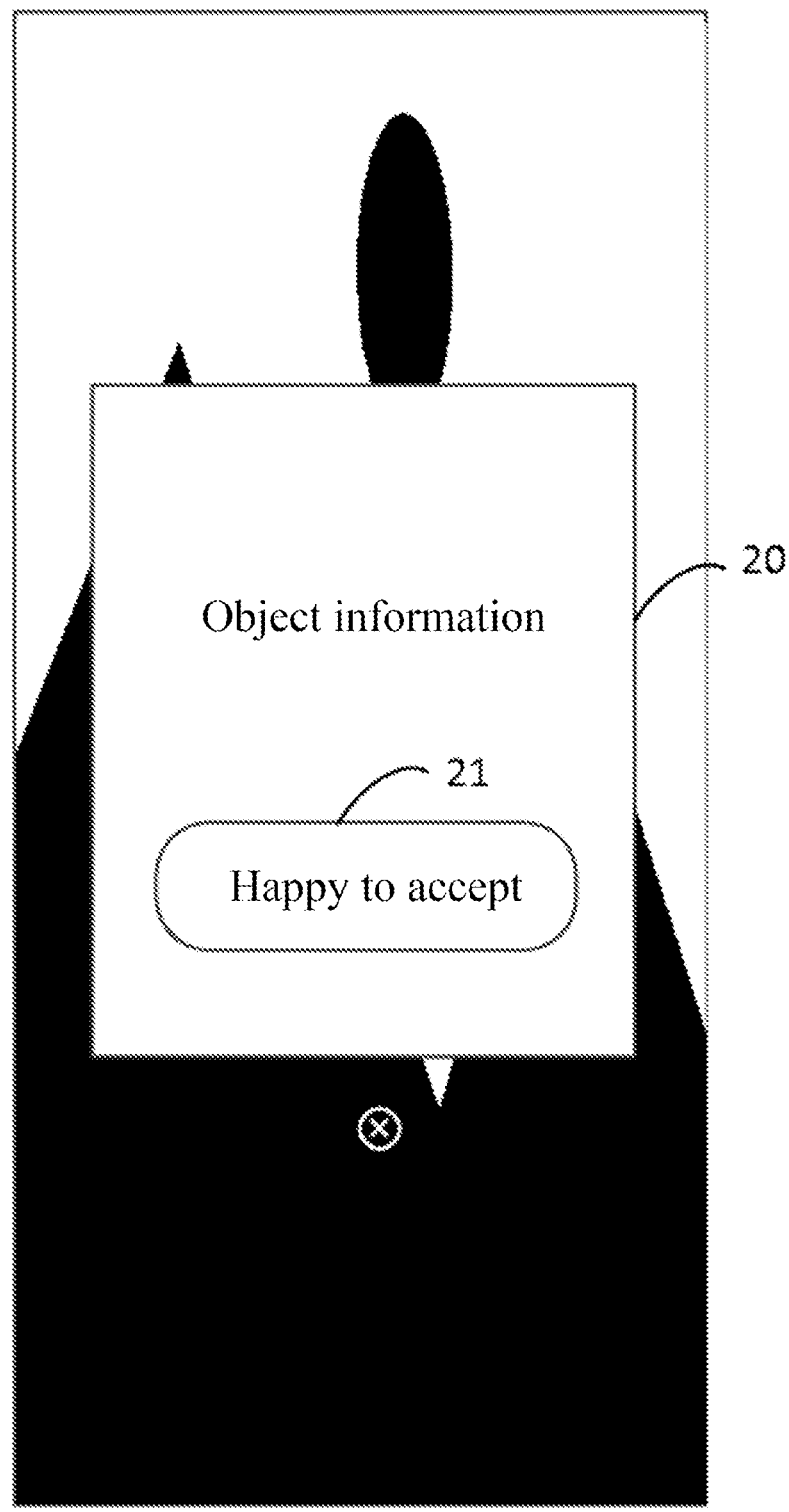
FIG. 2 is a diagram of a first object information window according to an embodiment of the present disclosure.
Figure 3:
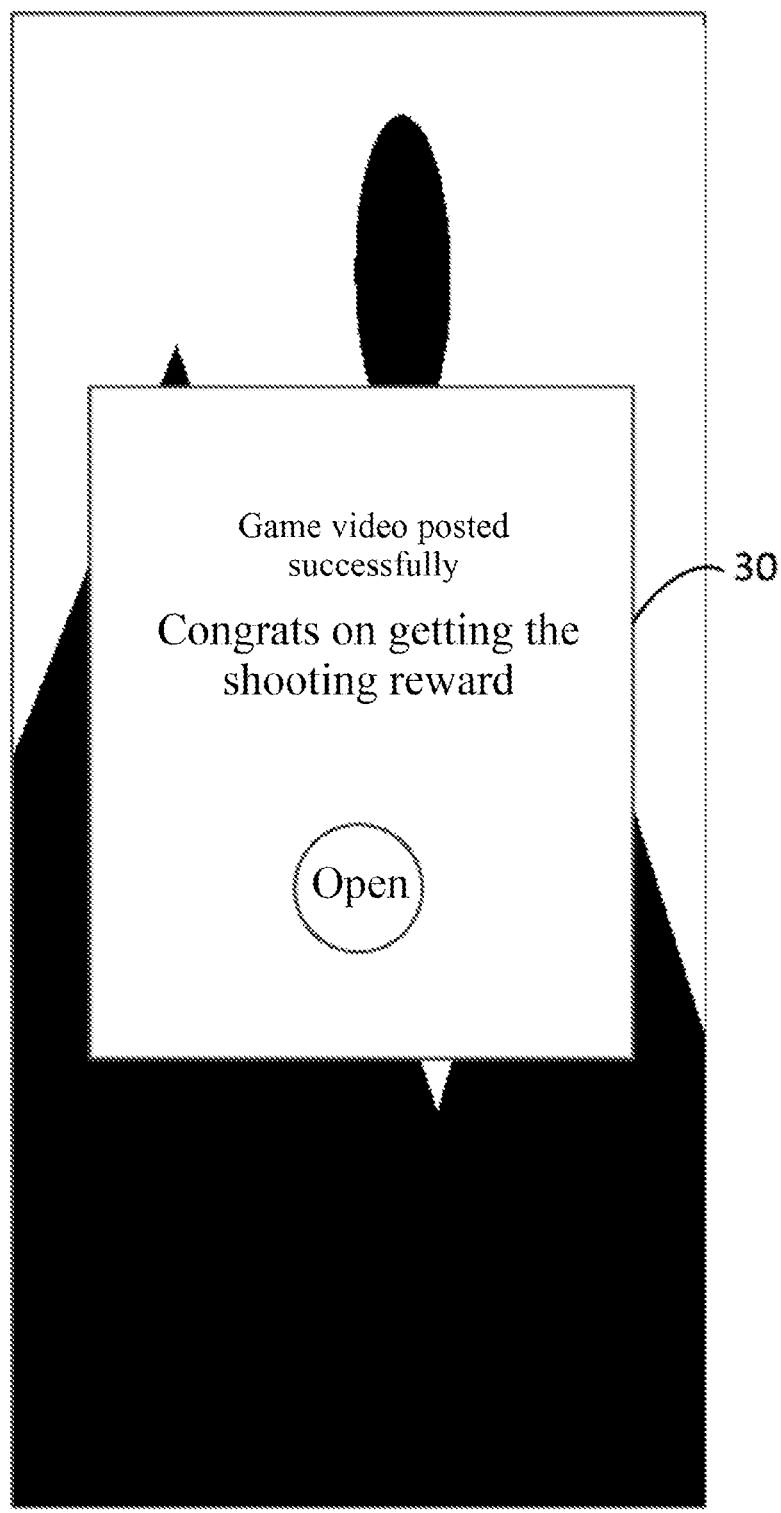
FIG. 3 is a diagram of an acceptance window according to an embodiment of the present disclosure.

In this embodiment, as shown in FIGS. 2 and 3, after paying the first target object to the account of the first user, the electronic device may display the first object information window 20 of the first target object; or the electronic device may display the acceptance window 30 corresponding to the first target according to a preset acceptance window display special effect, switch the acceptance window 30 to the first object information window 20 according to a preset switching special effect, and display the first object information window 20 according to a display special effect corresponding to the first object information window 20, for example, display object information in a scrolling manner and/or display a confirmation control 21 in the first object information window 20 in a flashing manner.

In this embodiment, after posting of the first video is finished, the first user or another user who has seen the first video may share the first video. Accordingly, the second user may view the video on the video play page and accept a viewing reward after viewing the first video; or the second user may view the first video and accept a viewing reward when receiving the first video shared by the first user or another user.

In the video interaction method of this embodiment, a video posting operation for a first video is received, where the first video is a video shot by a first user by using a target prop, where the target prop is a preset type of shooting prop; in response to the video posting operation, the first video is posted; in response to finishing posting the first video, information about the degree of completion of interaction between the first user and the target prop in the shooting process of the first video is acquired; a first target object corresponding to the first video is determined according to information about the degree of completion of interaction; and the first target object is paid to the account of the first user, and a first object information window of the first target object is displayed, where a second target object corresponding to the first video is used for being paid to the account of a second user after the first video is played by the user terminal of the second user. In the solution of this embodiment, a user can accept a video posting reward after shooting and posting a video, and another user can accept a viewing reward after viewing the video. In this manner, the interestingness of video shooting can be increased, and the level of interaction between the video poster and other users can be improved. Thus, the enthusiasm for video shooting and posting and the enthusiasm for video viewing can be improved, and the user experience can be improved.

Figure 4:
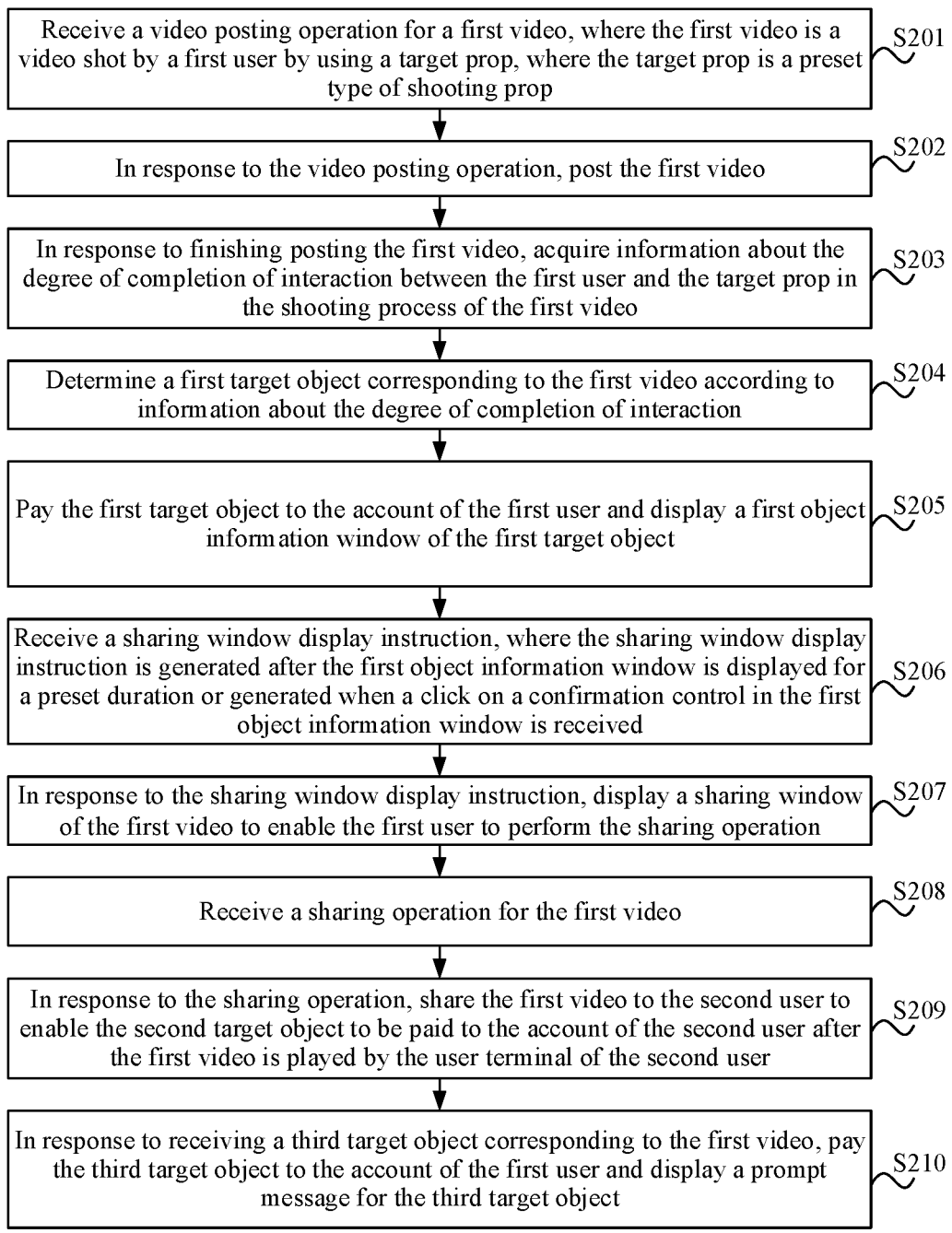
FIG. 4 is a flowchart of another video interaction method according to an embodiment of the present disclosure.

FIG. 4 is a flowchart of another video interaction method according to an embodiment of the present disclosure. The solution of this embodiment may be combined with one or more of the alternatives of the previous embodiments. Optionally, after displaying the first object information window of the first target object, the method also includes receiving a sharing operation for the first video; and in response to the sharing operation, sharing the first video to a second user to enable the second target object to be paid to the account of the second user after the first video is played by the user terminal of the second user.

Optionally, before receiving the sharing operation for the first video, the method also includes receiving a sharing window display instruction, where the sharing window display instruction is generated after the first object information window is displayed for a preset duration or generated when a click on the confirmation control in the first object information window is received; and in response to the sharing window display instruction, displaying a sharing window of the first video to enable the first user to perform the sharing operation.

Optionally, the video interaction method of this embodiment also includes, in response to receiving a third target object corresponding to the first video, paying the third target object corresponding to the first video to the account of the first user and displaying a prompt message for the third target object, where the third target object is generated after the user terminal of the second user pays the second target object to the account of the second user.

Accordingly, as shown in FIG. 4, the video interaction method of this embodiment includes the process below.

In S201, a video posting operation for a first video is received, where the first video is a video shot by a first user by using a target prop, where the target prop is a preset type of shooting prop.

In S202, in response to the video posting operation, the first video is posted.

In S203, in response to finishing posting the first video, information about the degree of completion of interaction between the first user and the target prop in the shooting process of the first video is acquired.

In S204, a first target object corresponding to the first video is determined according to information about the degree of completion of interaction.

In S205, the first target object is paid to the account of the first user, and a first object information window of the first target object is displayed, where a second target object corresponding to the first video is used for being paid to the account of a second user after the first video is played by the user terminal of the second user.

In S206, a sharing window display instruction is received, where the sharing window display instruction is generated after the first object information window is displayed for a preset duration or generated when a click on a confirmation control in the first object information window is received.

In S207, in response to the sharing window display instruction, a sharing window of the first video is displayed to enable the first user to perform the sharing operation.

The preset duration may be set according to requirements. The preset duration may be set to, for example, 3 s or 5 s.

The sharing window display instruction may be used for instructing the electronic device to display the sharing window of the first video.

In this embodiment, after posting the first video, the first user may share the first video with the second user to enable the second user to view the first video and accept a reward for viewing the first video.

Figure 5:
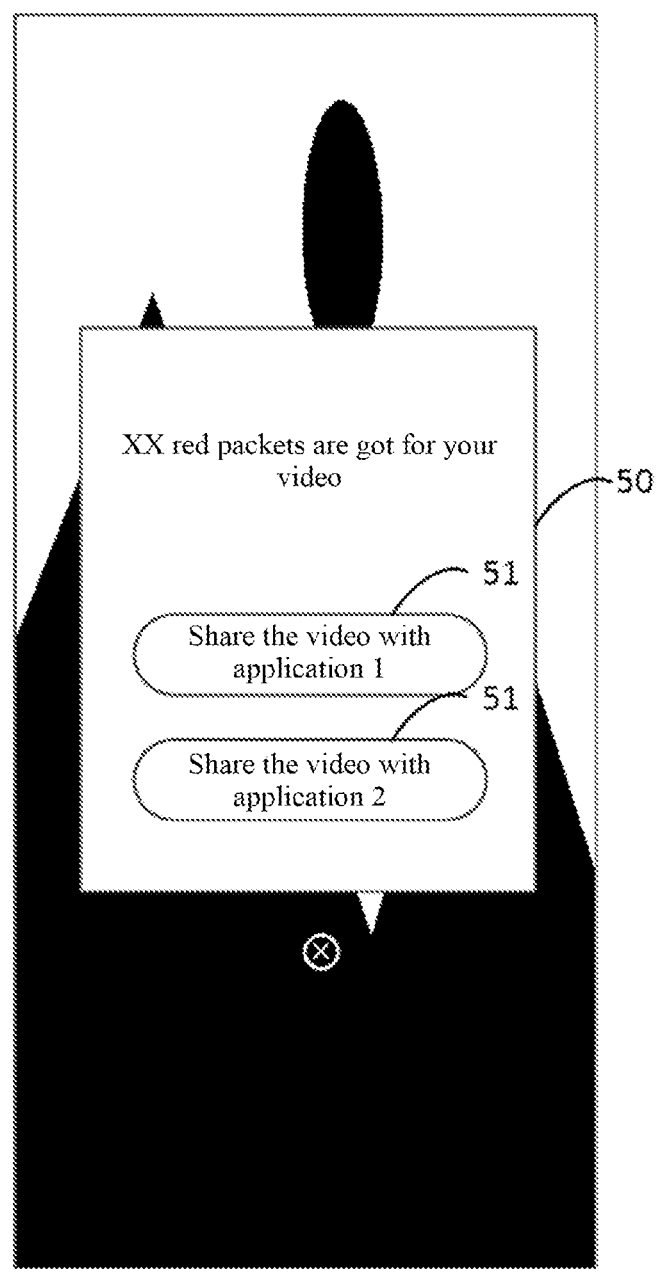
FIG. 5 is a diagram of a sharing window according to an embodiment of the present disclosure.

As shown in FIG. 2, after paying the first target object to the account of the first user, the electronic device may display the first object information window 20. When wanting to instruct the electronic device to display the sharing window, the first user may trigger the confirmation control 21 in the first object information window 20. Accordingly, when detecting that the first user triggers the confirmation control 21 or after displaying the first object information window 20 for the preset duration, the electronic device may generate the sharing window display instruction, display the sharing window 50 of the first video in response to the sharing window display instruction, and display at least one sharing control 51 in the sharing window 50, as shown in FIG. 5, to enable the first user to share the first video by triggering a sharing control 51 in the sharing window 50. Here when multiple sharing controls 51 are displayed in the sharing window 50, different sharing controls 51 may be used for instructing the electronic device to share the first video to different applications.

In S208, a sharing operation for the first video is received.

In S209, in response to the sharing operation, the first video is shared to the second user to enable the second target object to be paid to the account of the second user after the first video is played by the user terminal of the second user.

The sharing operation for the first video may be construed as a trigger operation for sharing the first video, for example, an operation of triggering a sharing control in the sharing window of the first video. The second user may be a user to whom the first user shares the first video.

The electronic device displays the sharing window. When wanting to share the first video, the first user may trigger a sharing control in the sharing window. When detecting that the first user triggers a sharing control in the sharing window, the electronic device may jump to the application corresponding to the sharing control or may generate a sharing password of the first video and jump to the application corresponding to the sharing control. Thus, the first user can select the second user in the application to share the video. Accordingly, when detecting that the first user selects the second user, the electronic device may send, in the application, the first video/sharing password to the second user.

In S210, in response to receiving a third target object corresponding to the first video, the third target object is paid to the account of the first user, and a prompt message for the third target object is displayed, where the third target object is generated after the user terminal of the second user pays the second target object to the account of the second user.

The third target object may be a reward paid for the first video, that is, a reward paid to the first user after the second user accepts the second target object corresponding to the first video.

In this embodiment, after a user other than the first user accepts the second target object corresponding to the first video, the first user may be awarded a reward again. For example, the first user may be awarded the third target object so that the first user's enthusiasm for shooting and posting videos can be improved.

Illustratively, the user equipment of the second user may play the first video posted/shared by the first user or play the first video according to the sharing password sent by the first user; and the second target object corresponding to the first video may be paid to the account of the second user based on the acceptance operation of the second user. Thus, after paying the second target object to the account of the second user on the user equipment of the second user, the background or server may pay the third target object to the user equipment of the first user. Accordingly, when receiving the third target object, the user equipment of the first user may pay the third target object to the account of the first user and display prompt information of the third target object to indicate to the first user that the third target object has been paid to the account of the first user. Thus, the first user may trigger the prompt message to enter a reward page to check information about how the second target object corresponding to the first video has been accepted by other users or check information about the target object received by the first user.

In this embodiment, a video posted by a user is shared with another user based on the user's sharing operation, and the user is awarded again after another user views and accepts a reward for viewing the video. In this manner, the level of interaction between the video poster and another user and the user's enthusiasm for shooting, posting, and sharing a video can be improved.

Figure 6:
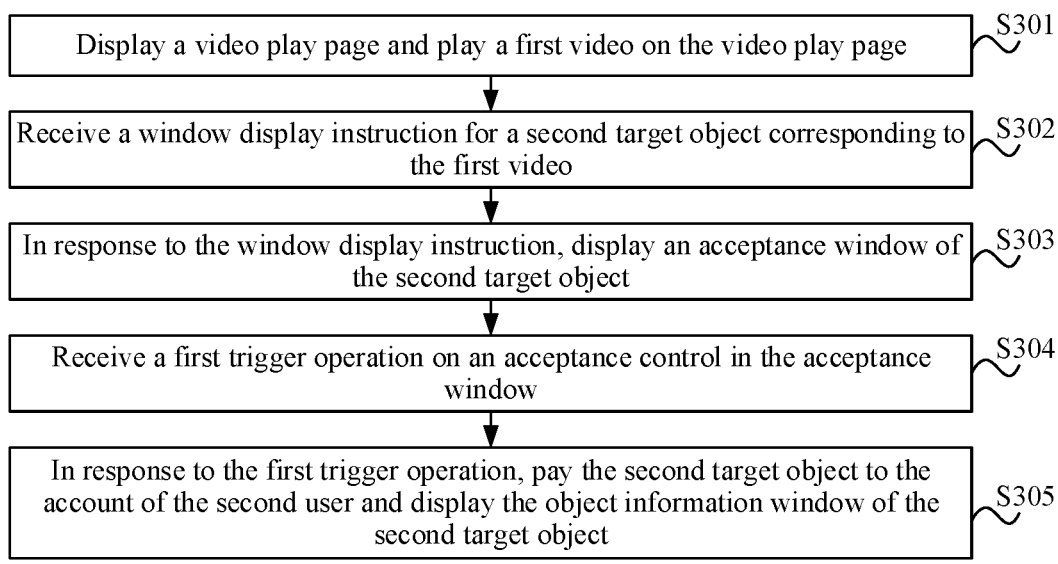
FIG. 6 is a flowchart of another video interaction method according to an embodiment of the present disclosure.

FIG. 6 is a flowchart of a video interaction method according to an embodiment of the present disclosure. The method may be performed by a video interaction apparatus. The apparatus may be implemented in software and/or hardware and may be configured in an electronic device such as a mobile phone or a tablet computer. The video interaction method of this embodiment of the present disclosure is applicable to the scenario of interaction with a video poster. As shown in FIG. 6, the video interaction method of this embodiment may include the process below.

In S301, a video play page is displayed, and a first video is played on the video play page, where the first video is a video shot by a first user by using a target prop and then posted by the first user, the target prop is a preset type of shooting prop, a first target object corresponding to the first video is used for being paid to the account of the first user when posting of the first video is finished, and the first target object is determined according to information about the degree of completion of interaction between the first user and the target prop in the shooting process of the first video.

Illustratively, the user terminal of the first user shoots, based on the trigger operation of the first user, a first target video by using the preset type of shooting prop, posts the video, determines, after posting of the video is finished, the first target object corresponding to the first video according to information about the degree of completion of interaction between the first user and the target prop in the shooting process of the first video, and pays the first target object corresponding to the first video to the account of the first user. When posting of the first video is finished, the electronic device (for example, the user terminal of a second user) may display the video play page and play the first video on the video play page based on the user's trigger operation.

In S302, a window display instruction for a second target object corresponding to the first video is received.

In S303, in response to the window display instruction, an acceptance window of the second target object is displayed.

The second target object corresponding to the first video may be a reward for viewing the first video. The window display instruction may be used for instructing the electronic device to display the acceptance window of the second target object corresponding to the first video to enable the second user to accept the second target object. The window display instruction may be generated automatically in the process of playing the first video, for example, generated when the first video is played for a preset duration or when the first video is played to a preset node or may be generated based on the second user's trigger operation, for example, generated when the second user clicks an object pendant of the first video.

The electronic device receives the window display instruction for the first video and, in response to the window display instruction, displays the acceptance window of the second target object corresponding to the first video to enable the second user to accept the second target object corresponding to the first video.

In an embodiment, to avoid excessive disturbance caused by the automatic display of the acceptance window when the second user views the first video, it is feasible to display the acceptance window of the first video automatically only when the second user has not accepted the second target object corresponding to the first video and the second target object has not been all accepted. In this case, before receiving the window display instruction for the second target object corresponding to the first video, the method also includes, in response to the first video being played to a preset node, the second target object being not paid to the account of the second user, and the unpaid second target object for the first video existing, generating a window display instruction for the second target object corresponding to the first video.

The preset node may be a node in the first video. The preset node may be located in the middle of the first video or at the end of the first video. For example, the preset node is located at the end of the first video, enabling the second user to accept a viewing reward for the first video when the first video is completely viewed (that is, when the first video has all been played).

Illustratively, when the first video is played to the preset node on the video play page, the electronic device determines whether the second user has not accepted the second target object corresponding to the first video (that is, whether the second target object corresponding to the first video has not been paid to the account of the second user) and whether the unaccepted second target object for the first video exists (that is, whether the second target object unpaid for the first video exists). When determining that the second user has not accepted the second target object corresponding to the first video and that the unaccepted second target object for the first video exists, window display instruction is generated and in response to the generated window display instruction, the electronic device displays the acceptance window of the second target object corresponding to the first video.

Additionally, if the second user has not switched the video played on the video play page or has not exited the video play page after the first video is completely played, the first video may be played cyclically on the video play page. When the first video is played cyclically, it is feasible to generate the window display instruction only when the first video is played to the preset node for the first time. In this manner, the second user is not disturbed by multiple times of display of the acceptance window when the second user views the first video.

In this embodiment, the electronic device may not take into account how the first video is played, that is, directly generate the window display instruction when receiving a second trigger operation on the object pendant of the first video; or may take into account how the first video is played, that is, generate the window display instruction only when the first video is played to (or pass) the preset node to ensure that the second target object corresponding to the first video can be accepted only when the first video is played to at least the preset node. In this case, optionally, before receiving the window display instruction for the second target object corresponding to the first video, the method also includes, in response to receiving a second trigger operation on an object pendant of the first video, generating the window display instruction for the second target object corresponding to the first video; or in response to receiving a second trigger operation on an object pendant of the first video and in response to the first video being played to a preset node, generating the window display instruction for the second target object corresponding to the first video.

The object pendant may be triggered by a user to accept or check the second target object corresponding to the first video. The second trigger operation may be an operation of triggering the object pendant of the first video.

Figure 7:
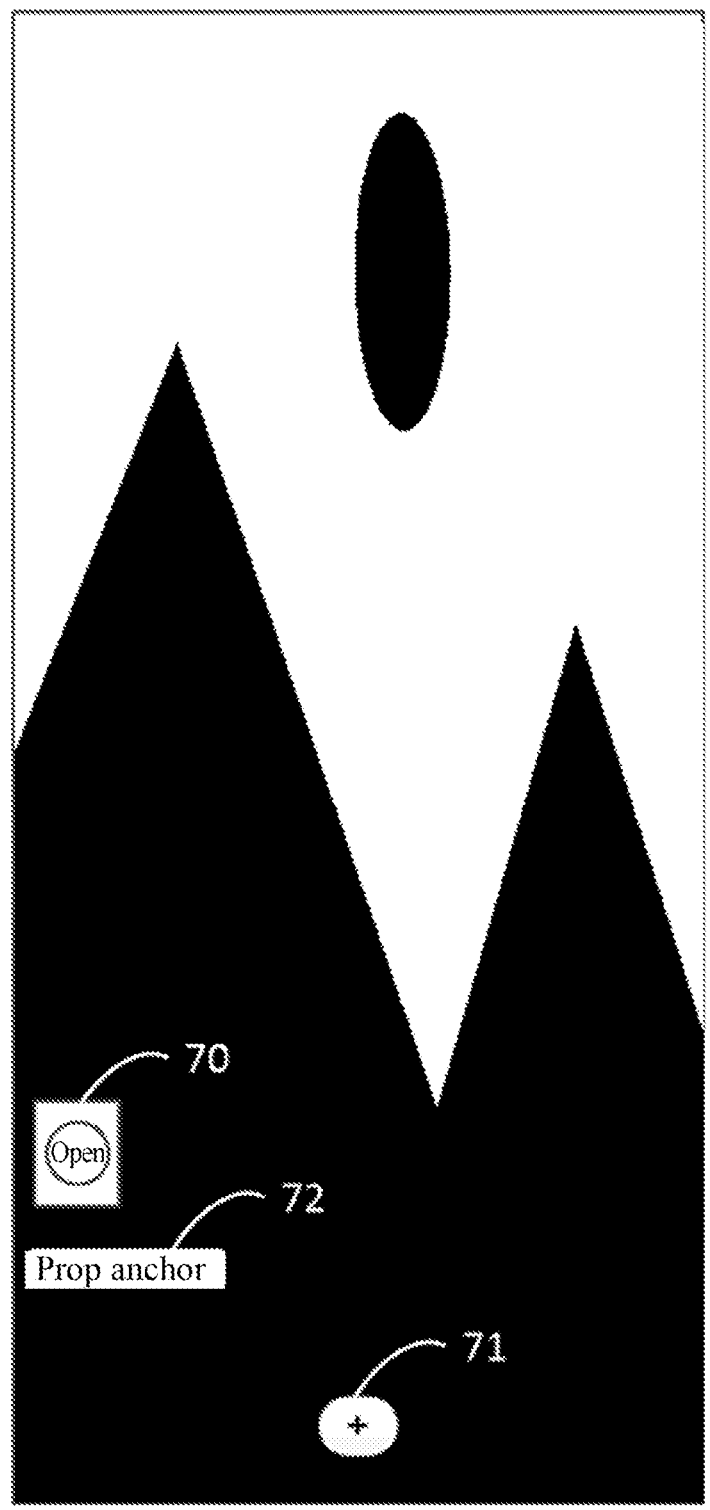
FIG. 7 is a diagram of a video play page according to an embodiment of the present disclosure.

Illustratively, as shown in FIG. 7, the electronic device plays the first video on the video play page and displays the object pendant 70 of the first video on the video play page. When wanting to accept the second target object corresponding to the first video or check the second target object that has been accepted by the second user, the second user may trigger the object pendant 70. When detecting that the second user triggers the object pendant 70, the electronic device determines that the second trigger operation is received, generates the window display instruction, and in response to the generated window display instruction, displays the acceptance window of the second target object. Alternatively, when detecting that the second user triggers the object pendant 70, the electronic device determines that the second trigger operation is received; determines whether the first video has been played to the preset node; if the first video has been played to the preset node, generates the window display instruction and in response to the generated window display instruction, displays the acceptance window of the second target object; and if the first video has not been played to the preset node, does not respond to the second trigger operation or responds later when the first video is played to the preset node, that is, generates the window display instruction and in response to the generated window display instruction, displays the acceptance window of the second target object.

Additionally, as shown in FIG. 7, the video play page may also display a shooting control 71 and a prop anchor 72 of the target prop used by the first user to shoot the first video.

In an embodiment, before displaying the acceptance window of the second target object, the method also includes determining that the second target object is not paid to the account of the second user and that the unpaid second target object for the first video exists; and the method also includes, in response to the second target object being paid to the account of the second user, displaying the object information window of the second target object; and in response to the second target object not being paid to the account of the second user and the unpaid second target object for the first video not existing, displaying an acceptance prompt window of the second target object to indicate to the second user that the unaccepted second target object does not exist.

In this embodiment, after generating the window display instruction of the first video in response to the second trigger operation, the electronic device may determine whether the second user has not accepted the second target object corresponding to the first video and whether the unaccepted second target object for the first video exists. If the second user has not accepted the second target object corresponding to the first video, the electronic device may display the acceptance window of the first video to enable the second user to accept the second target object corresponding to the first video. If the second user has accepted the second target object corresponding to the first video, the electronic device may display the object information window of the second target object accepted by the second user to enable the second user to check object information of the second target object accepted by the second user. If the second user has not accepted the second target object corresponding to the first video and if the second target object corresponding to the first video has all been accepted, the electronic device may display the acceptance prompt window 80 (as shown in FIG. 8) to indicate to the user that the second target object has all been accepted.

Figure 8:
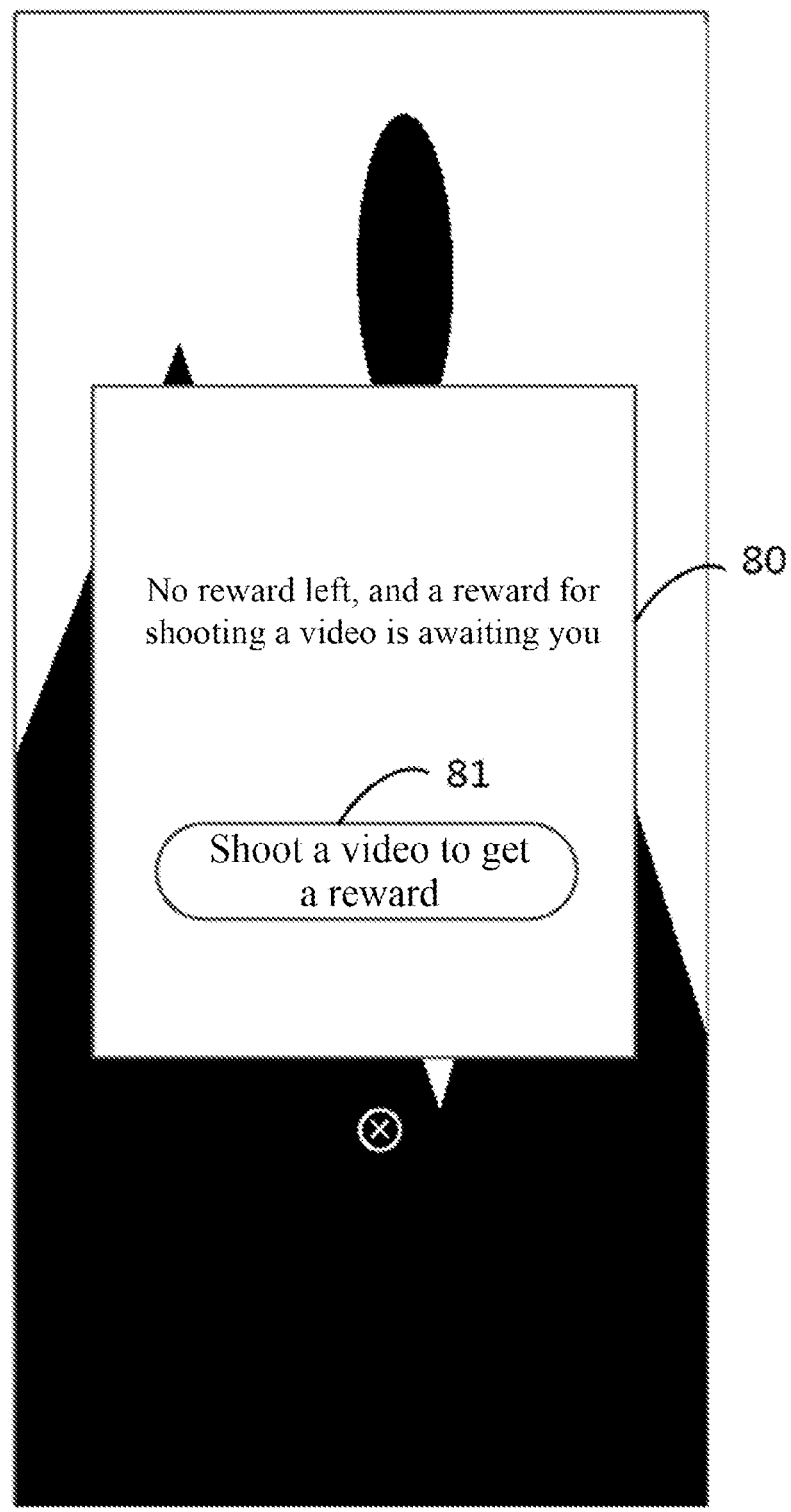
FIG. 8 is a diagram of an acceptance prompt window according to an embodiment of the present disclosure.

In this embodiment, the object information window of the second target object may contain a first shooting control, and the acceptance prompt window 80 of the second target object may contain a second shooting control 81 (as shown in FIG. 8) so that after the user checks the second target object accepted by the user or when the user has not accepted the second target object, the user can trigger the first shooting control/second shooting control to shoot a video to gain more rewards. In this case, the video interaction method of this embodiment also includes receiving a third trigger operation on a video shooting control, where the video shooting control includes at least one of the first shooting control in the object information window or the second shooting control in the acceptance prompt window; and in response to the third trigger operation, displaying a video shooting page to enable the second user to shoot a second video on the shooting page by using the preset type of shooting prop and then post the second video.

Illustratively, the electronic device displays the object information window of the second target object. When wanting to shoot a video, the second user may trigger the first video shooting control in the object information window. Accordingly, when detecting that the second user triggers the first video shooting control in the object information window, the electronic device may determine that the third trigger operation is received and in response to the third trigger operation, display the video shooting page to enable the second user to shoot a video. Alternatively, the electronic device displays the acceptance prompt window of the second target object. When wanting to shoot a video, the second user may trigger the second video shooting control in the acceptance prompt window. Accordingly, when detecting that the second user triggers the second video shooting control in the acceptance prompt window, the electronic device may determine that the third trigger operation is received and in response to the third trigger operation, display the video shooting page to enable the second user to shoot a video.

In S304, a first trigger operation on an acceptance control in the acceptance window is received.

In S305, in response to the first trigger operation, the second target object is paid to the account of the second user, and the object information window of the second target object is displayed.

The first trigger operation may be an operation of triggering the acceptance control in the acceptance window. The first trigger operation may be used for instructing the electronic device to pay the second target object corresponding to the first video to the account of the second user. The total number of acceptances for the second target object corresponding to the first video may be preset to, for example, 20. Accordingly, the second target object corresponding to the first video may be accepted by 20 different users.

The electronic device displays the acceptance window of the second target object corresponding to the first video. Thus, when wanting to accept the second target object corresponding to the first video, the user may click the acceptance control in the acceptance window. Accordingly, when detecting that the second user clicks the acceptance control, the electronic device may determine that the first trigger operation is received, in response to the first trigger operation, pay the second target object corresponding to the first video to the account of the second user, display the object information window of the second target object, and display, in the object information window, object information of the second target object paid to the account of the second user (for example, the type and/or amount of the second target object paid to the account of the second user).

In the video interaction method of this embodiment, a video play page is displayed, and a first video is played on the video play page, where the first video is a video shot by a first user by using a target prop and then posted by the first user, the target prop is a preset type of shooting prop, a first target object corresponding to the first video is used for being paid to the account of the first user when posting of the first video is finished, and the first target object is determined according to information about the degree of completion of interaction between the first user and the target prop in the shooting process of the first video; a window display instruction for a second target object corresponding to the first video is received; in response to the window display instruction, an acceptance window of the second target object is displayed; a first trigger operation on an acceptance control in the acceptance window is received; and in response to the first trigger operation, the second target object is paid to the account of the second user, and the object information window of the second target object is displayed. In the solution of this embodiment, a user can accept a video posting reward after shooting and posting a video, and another user can accept a viewing reward after viewing the video. In this manner, the interestingness of video shooting can be increased, and the level of interaction between the video poster and the video viewer can be improved. Thus, the enthusiasm for video shooting and posting and the enthusiasm for video viewing can be improved, and the user experience can be improved.

Figure 9:
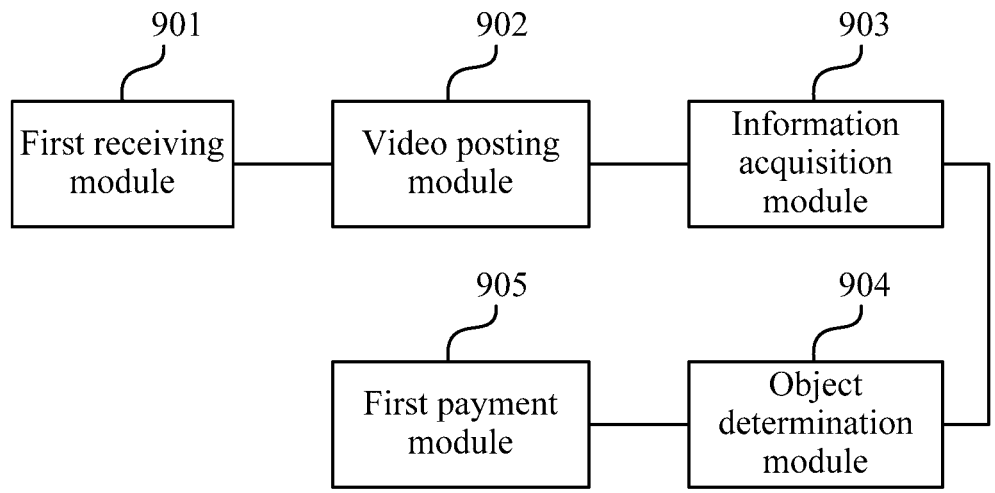
FIG. 9 is a block diagram of a video interaction apparatus according to an embodiment of the present disclosure.

FIG. 9 is a block diagram of a video interaction apparatus according to an embodiment of the present disclosure. The apparatus may be implemented in software and/or hardware and may be configured in an electronic device such as a mobile phone or a tablet computer. The apparatus may perform a video interaction method to perform interaction. As shown in FIG. 9, the video interaction apparatus of this embodiment may include a first receiving module 901, a video posting module 902, an information acquisition module 903, an object determination module 904, and a first payment module 905.

The first receiving module 901 is configured to receive a video posting operation for a first video, where the first video is a video shot by a first user by using a target prop, where the target prop is a preset type of shooting prop. The video posting module 902 is configured to, in response to the video posting operation, post the first video. The information acquisition module 903 is configured to, in response to finishing posting the first video, acquire information about the degree of completion of interaction between the first user and the target prop in the shooting process of the first video.

The object determination module 904 is configured to determine a first target object corresponding to the first video according to information about the degree of completion of interaction. The first payment module 905 is configured to pay the first target object to the account of the first user and display a first object information window of the first target object, where a second target object corresponding to the first video is used for being paid to the account of a second user after the first video is played by the user terminal of the second user.

In the video interaction apparatus of this embodiment, the first receiving module 901 is configured to receive a video posting operation for a first video, where the first video is a video shot by a first user by using a target prop, where the target prop is a preset type of shooting prop; the video posting module 902 is configured to, in response to the video posting operation, post the first video; the information acquisition module 903 is configured to, in response to finishing posting the first video, acquire information about the degree of completion of interaction between the first user and the target prop in the shooting process of the first video; the object determination module 904 is configured to determine a first target object corresponding to the first video according to information about the degree of completion of interaction; and the first payment module 905 is configured to pay the first target object to the account of the first user and display a first object information window of the first target object, where a second target object corresponding to the first video is used for being paid to the account of a second user after the first video is played by the user terminal of the second user. In the solution of this embodiment, a user can accept a video posting reward after shooting and posting a video, and another user can accept a viewing reward after viewing the video. In this manner, the interestingness of video shooting can be increased, and the level of interaction between the video poster and the video viewer can be improved. Thus, the enthusiasm for video shooting and posting and the enthusiasm for video viewing can be improved, and the user experience can be improved.

The video interaction apparatus of this embodiment may also include a third receiving module and a video sharing module. The third receiving module is configured to receive a sharing operation for the first video after the first object information window of the first target object is displayed. The video sharing module is configured to, in response to the sharing operation, share the first video to the second user to enable the second target object to be paid to the account of the second user after the first video is played by the user terminal of the second user.

The video interaction apparatus of this embodiment may also include a second instruction receiving module and a sharing window display module. The second instruction receiving module is configured to receive a sharing window display instruction before the sharing operation for the first video is received, where the sharing window display instruction is generated after the first object information window is displayed for a preset duration or generated when a click on a confirmation control in the first object information window is received. The sharing window display module is configured to, in response to the sharing window display instruction, display a sharing window of the first video to enable the first user to perform the sharing operation.

The video interaction apparatus of this embodiment may also include a prompt information display module. The prompt information display module is configured to, in response to receiving a third target object corresponding to the first video, pay the third target object corresponding to the first video to the account of the first user and display a prompt message for the third target object, where the third target object is generated after the user terminal of the second user pays the second target object to the account of the second user.

The video interaction apparatus of this embodiment may also include a fourth receiving module and a first shooting page display module. The fourth receiving module is configured to receive a trigger operation on a video shooting control before the video posting operation for the first video is received, where the video shooting control includes at least one of a first shooting control in a second object information window or a second shooting control in an acceptance prompt window, the second object information window is displayed after the first user accepts a fourth target object corresponding to the second video, the acceptance prompt window is displayed when an acceptance operation performed for the fourth target object by the first user is received and the unaccepted fourth target object for the second video does not exist, and the second video is posted by a user other than the first user. The first shooting page display module is configured to, in response to the trigger operation, display a video shooting page to enable the first user to shoot the first video on the shooting page by using the target prop.

The video interaction apparatus of this embodiment of the present disclosure can perform the video interaction method of embodiments of the present disclosure through the user terminal of the first user and has function modules and effects corresponding to the performed method. For technical details not described in detail in this embodiment, see the video interaction method of embodiments of the present disclosure performed through the user terminal of the first user.

Figure 10:
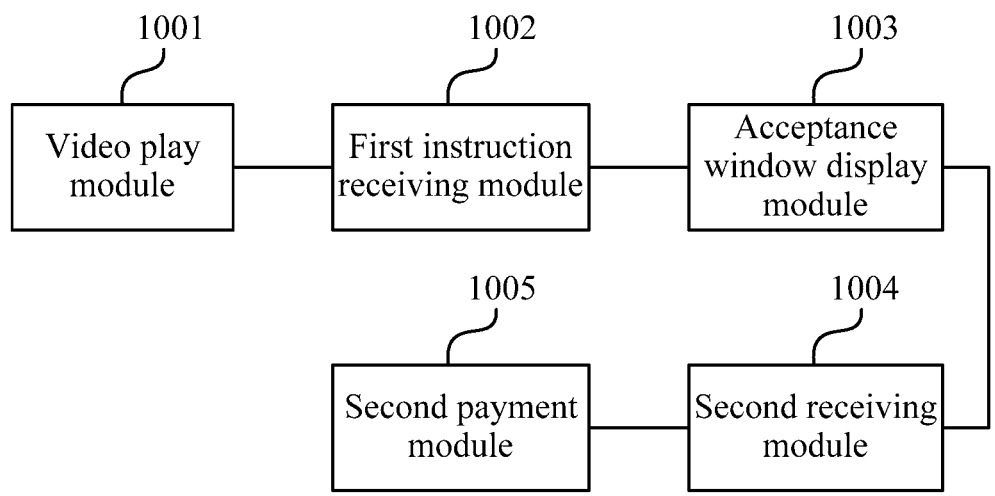
FIG. 10 is a block diagram of another video interaction apparatus according to an embodiment of the present disclosure.

FIG. 10 is a block diagram of a video interaction apparatus according to an embodiment of the present disclosure. The apparatus may be implemented in software and/or hardware and may be configured in an electronic device such as a mobile phone or a tablet computer. The apparatus can perform a video interaction method to perform interaction. As shown in FIG. 10, the video interaction apparatus of this embodiment may include a video play module 1001, a first instruction receiving module 1002, an acceptance window display module 1003, a second receiving module 1004, and a second payment module 1005.

The video play module 1001 is configured to display a video play page and play a first video on the video play page, where the first video is a video shot by a first user by using a target prop and then posted by the first user, the target prop is a preset type of shooting prop, a first target object corresponding to the first video is used for being paid to the account of the first user when posting of the first video is finished, and the first target object is determined according to information about the degree of completion of interaction between the first user and the target prop in the shooting process of the first video. The first instruction receiving module 1002 is configured to receive a window display instruction for a second target object corresponding to the first video. The acceptance window display module 1003 is configured to, in response to the window display instruction, display an acceptance window of the second target object. The second receiving module 1004 is configured to receive a first trigger operation on an acceptance control in the acceptance window. The second payment module 1005 is configured to, in response to the first trigger operation, pay the second target object to the account of a second user and display an object information window of the second target object.

In the video interaction apparatus of this embodiment, the video play module 1001 is configured to display a video play page and play a first video on the video play page, where the first video is a video shot by a first user by using a target prop and then posted by the first user, the target prop is a preset type of shooting prop, a first target object corresponding to the first video is used for being paid to the account of the first user when posting of the first video is finished, and the first target object is determined according to information about the degree of completion of interaction between the first user and the target prop in the shooting process of the first video; the first instruction receiving module 1002 is configured to receive a window display instruction for a second target object corresponding to the first video; the acceptance window display module 1003 is configured to, in response to the window display instruction, display an acceptance window of the second target object; the second receiving module 1004 is configured to receive a first trigger operation on an acceptance control in the acceptance window; and the second payment module 1005 is configured to, in response to the first trigger operation, pay the second target object to the account of a second user and display an object information window of the second target object. In the solution of this embodiment, a user can accept a video posting reward after shooting and posting a video, and another user can accept a viewing reward after viewing the video. In this manner, the interestingness of video shooting can be increased, and the level of interaction between the video poster and the video viewer can be improved. Thus, the enthusiasm for video shooting and posting and the enthusiasm for video viewing can be improved, and the user experience can be improved.

In this solution, the video interaction apparatus of this embodiment may also include a first instruction generation module. The first instruction generation module is configured to, before the window display instruction for the second target object corresponding to the first video is received, in response to the first video being played to a preset node, the second target object being not paid to the account of the second user, and the unpaid second target object for the first video existing, generate a window display instruction for the second target object corresponding to the first video.

In this solution, the video interaction apparatus of this embodiment may also include a second instruction generation module. The second instruction generation module is configured to, before the window display instruction for the second target object corresponding to the first video is received, in response to receiving a second trigger operation on an object pendant of the first video, generate the window display instruction for the second target object corresponding to the first video; or in response to receiving a second trigger operation on an object pendant of the first video and in response to the first video being played to a preset node, generate the window display instruction for the second target object corresponding to the first video.

In this solution, the video interaction apparatus of this embodiment may also include a payment determination module, an information window display module, and a prompt window display module. The payment determination module is configured to, before the acceptance window of the second target object is displayed, determine that the second target object is not paid to the account of the second user and that the unpaid second target object for the first video exists. The information window display module is configured to, in response to the second target object being paid to the account of the second user, display the object information window of the second target object. The prompt window display module is configured to, in response to the second target object not being paid to the account of the second user and the unpaid second target object for the first video not existing, display an acceptance prompt window of the second target object to indicate to the second user that the unaccepted second target object does not exist.

In this solution, the video interaction apparatus of this embodiment may also include a fifth receiving module and a second shooting page display module. The fifth receiving module is configured to receive a third trigger operation on a video shooting control, where the video shooting control includes at least one of a first shooting control in the object information window or a second shooting control in the acceptance prompt window. The second shooting page display module is configured to, in response to the third trigger operation, display a video shooting page to enable the second user to shoot a second video on the shooting page by using the preset type of shooting prop and then post the second video.

The video interaction apparatus of this embodiment of the present disclosure can perform the video interaction method of embodiments of the present disclosure through the user terminal of the second user and has function modules and effects corresponding to the performed method. For technical details not described in detail in this embodiment, see the video interaction method of embodiments of the present disclosure performed through the user terminal of the second user.

Figure 11:
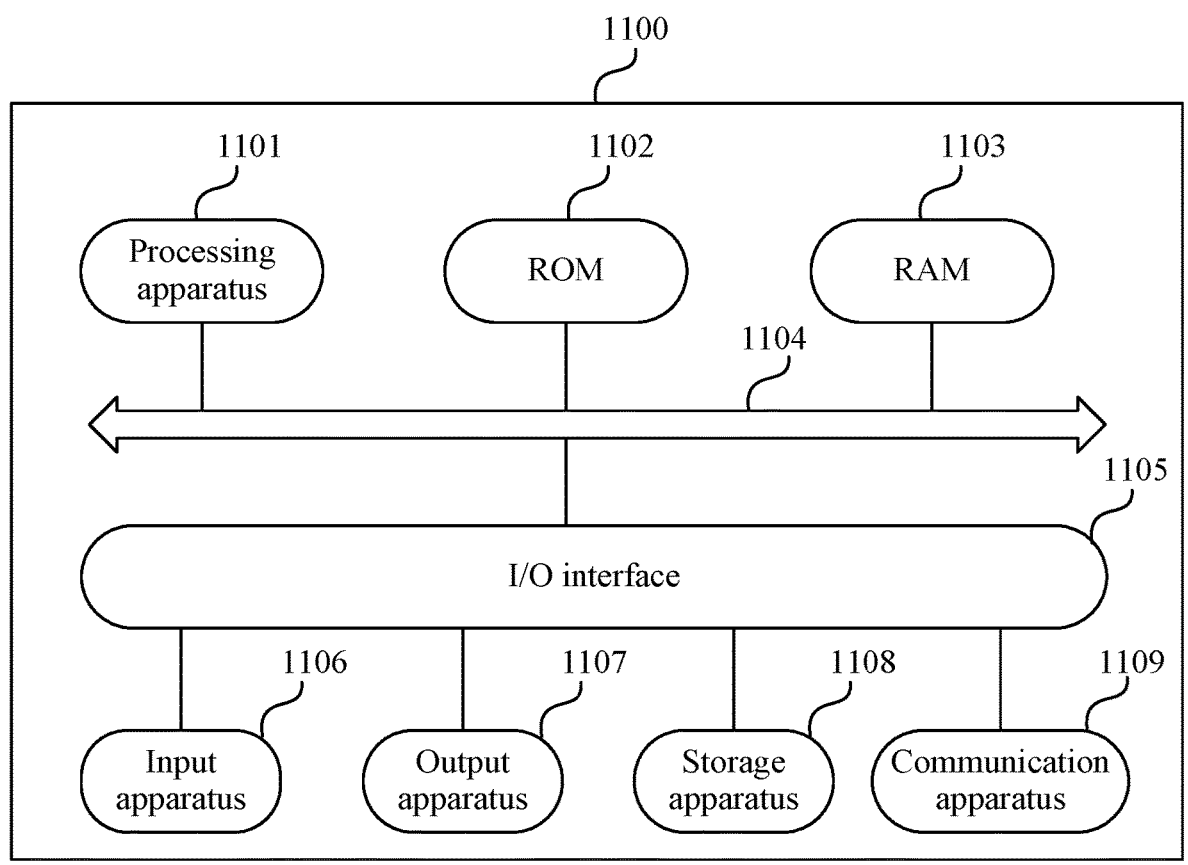
FIG. 11 is a diagram illustrating the structure of an electronic device according to an embodiment of the present disclosure.

FIG. 11 is a diagram illustrating the structure of an electronic device (for example, a terminal device) 1100 for implementing any embodiment of the present disclosure. The terminal device in embodiments of the present disclosure may include, but is not limited to, a mobile terminal such as a mobile phone, a laptop, a digital broadcast receiver, a personal digital assistant (PDA), a portable Android device (PAD), a portable media player (PMP) and an in-vehicle terminal (such as an in-vehicle navigation terminal) and a stationary terminal such as a digital television (TV) and a desktop computer. The electronic device shown in FIG. 11 is an example and is not intended to limit the function and use range of this embodiment of the present disclosure.

As shown in FIG. 11, the electronic device 1100 may include a processing apparatus (such as a central processing unit and a graphics processing unit) 1101. The processing apparatus 1101 may execute multiple appropriate actions and processing according to a program stored in a read-only memory (ROM) 1102 or a program loaded into a random-access memory (RAM) 1103 from a storage apparatus 1108. The RAM 1103 also stores various programs and data required for the operation of the electronic device 1100. The processing apparatus 1101, the ROM 1102 and the RAM 1103 are connected to each other through a bus 1104. An input/output (I/O) interface 1105 is also connected to the bus 1104.

Generally, the following apparatuses may be connected to the I/O interface 1105: an input apparatus 1106 such as a touch screen, a touch pad, a keyboard, a mouse, a camera, a microphone, an accelerometer and a gyroscope; an output apparatus 1107 such as a liquid crystal display (LCD), a speaker and a vibrator; the storage apparatus 1108 such as a magnetic tape and a hard disk; and a communication apparatus 1109. The communication apparatus 1109 may allow the electronic device 1100 to perform wireless or wired communication with other devices to exchange data. Although FIG. 11 shows the electronic device 1100 having various apparatuses, not all the apparatuses shown here need to be implemented or present. Alternatively, more or fewer apparatuses may be implemented or present.

According to an embodiment of the present disclosure, the process described above with reference to flowcharts may be implemented as a computer software program. For example, a computer program product is included in the embodiment of the present disclosure. The computer program product includes a computer program carried on a non-transitory computer-readable medium. The computer program includes program codes for executing the methods shown in the flowcharts. In such an embodiment, the computer program may be downloaded from a network and installed through the communication apparatus 1109, or may be installed from the storage apparatus 1108, or may be installed from the ROM 1102. When the computer program is executed by the processing apparatus 1101, the preceding functions defined in the method of embodiments of the present disclosure are executed.

The preceding computer-readable medium of the present disclosure may be a computer-readable signal medium or a computer-readable storage medium or any combination thereof. The computer-readable storage medium may be, but is not limited to, for example, an electronic, magnetic, optical, electromagnetic, infrared or semiconductor system, apparatus or device, or any combination thereof. Examples of the computer-readable storage medium may include, but are not limited to, an electrical connection having one or more wires, a portable computer disk, a hard disk, a RAM, a ROM, an erasable programmable read-only memory (EPROM), a flash memory, an optical fiber, a portable compact disc read-only memory (CD-ROM), an optical memory device, a magnetic memory device, or any suitable combination thereof. In the present disclosure, the computer-readable storage medium may be any tangible medium including or storing a program. The program may be used by or used in conjunction with an instruction execution system, apparatus, or device. In the present disclosure, the computer-readable signal medium may include a data signal propagated on a baseband or as part of a carrier, where computer-readable program codes are carried in the data signal. The data signal propagated in this manner may be in multiple forms and includes, but is not limited to, an electromagnetic signal, an optical signal, or any suitable combination thereof. The computer-readable signal medium may also be any computer-readable medium except the computer-readable storage medium. The computer-readable signal medium may send, propagate, or send a program used by or used in conjunction with an instruction execution system, apparatus, or device. The program codes included in the computer-readable medium may be sent in any suitable medium, including, but not limited to, a wire, an optical cable, a radio frequency (RF), or any suitable combination thereof.

In some embodiments, clients and servers may communicate using any currently known or future developed network protocol, such as the Hypertext Transfer Protocol (HTTP), and may be interconnected with any form or medium of digital data communication (for example, a communication network). Examples of the communication network include a local area network (LAN), a wide area networks (WAN), an internet (for example, the Internet), a peer-to-peer network (for example, an Ad-Hoc network), and any network currently known or to be developed in the future.

The preceding computer-readable medium may be included in the preceding electronic device or may exist alone without being assembled into the electronic device.

The computer-readable medium carries one or more programs. When the one or more programs are executed by the electronic device, the electronic device performs the following process: receiving a video posting operation for a first video, where the first video is a video shot by a first user by using a target prop, where the target prop is a preset type of shooting prop; in response to the video posting operation, posting the first video; in response to finishing posting the first video, acquiring information about the degree of completion of interaction between the first user and the target prop in the shooting process of the first video; determining a first target object corresponding to the first video according to information about the degree of completion of interaction; and paying the first target object to the account of the first user and displaying a first object information window of the first target object, where a second target object corresponding to the first video is used for being paid to the account of a second user after the first video is played by the user terminal of the second user.

Alternatively, the computer-readable medium carries one or more programs. When the one or more programs are executed by the electronic device, the electronic device performs the following process: displaying a video play page and playing a first video on the video play page, where the first video is a video shot by a first user by using a target prop and then posted by the first user, the target prop is a preset type of shooting prop, a first target object corresponding to the first video is used for being paid to the account of the first user when posting of the first video is finished, and the first target object is determined according to information about the degree of completion of interaction between the first user and the target prop in the shooting process of the first video; receiving a window display instruction for a second target object corresponding to the first video; in response to the window display instruction, displaying an acceptance window of the second target object; receiving a first trigger operation on an acceptance control in the acceptance window; and in response to the first trigger operation, paying the second target object to the account of a second user and displaying an object information window of the second target object.

Computer program codes for executing the operations in the present disclosure may be written in one or more programming languages or combination thereof. The preceding one or more programming languages include, but are not limited to, object-oriented programming languages such as Java, Smalltalk and C++, as well as conventional procedural programming languages such as C or similar programming languages. Program codes may be executed entirely on a user computer, executed partly on a user computer, executed as a stand-alone software package, executed partly on a user computer and partly on a remote computer, or executed entirely on a remote computer or a server. In the case involving the remote computer, the remote computer may be connected to the user computer through any type of network including a LAN or a WAN, or may be connected to an external computer (for example, via the Internet through an Internet service provider).

The flowcharts and block diagrams in the drawings show possible architectures, functions and operations of the system, method and computer program product according to multiple embodiments of the present disclosure. In this regard, each block in the flowcharts or block diagrams may represent a module, a program segment, or part of codes that contains one or more executable instructions for implementing specified logical functions. It is also to be noted that in some alternative implementations, the functions marked in the blocks may occur in an order different from those marked in the drawings. For example, two successive blocks may, in fact, be executed substantially in parallel or in a reverse order, which depends on the functions involved. It is also to be noted that each block in the block diagrams and/or flowcharts and a combination of blocks in the block diagrams and/or flowcharts may be implemented by a special-purpose hardware-based system which performs specified functions or operations or a combination of special-purpose hardware and computer instructions.

The units involved in embodiments of the present disclosure may be implemented by software or hardware. The name of a module is not intended to limit the unit itself in a certain circumstance.

The functions described above herein may be executed, at least partially, by one or more hardware logic components. For example, without limitation, exemplary types of hardware logic components that may be used include a field programmable gate array (FPGA), an application-specific integrated circuit (ASIC), application-specific standard parts (ASSP), a system on a chip (SOC), a complex programmable logic device (CPLD) and the like.

In the context of the present disclosure, a machine-readable medium may be a tangible medium that may include or store a program that is used by or used in conjunction with an instruction execution system, apparatus or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device, or any suitable combination thereof. Examples of the machine-readable storage medium may include an electrical connection based on one or more wires, a portable computer disk, a hard disk, a RAM, a ROM, an EPROM, a flash memory, an optical fiber, a CD-ROM, an optical storage device, a magnetic storage device, or any suitable combination thereof.

According to one or more embodiments of the present disclosure, example one provides a video interaction method. The method includes receiving a video posting operation for a first video, where the first video is a video shot by a first user by using a target prop, where the target prop is a preset type of shooting prop; in response to the video posting operation, posting the first video; in response to finishing posting the first video, acquiring information about the degree of completion of interaction between the first user and the target prop in the shooting process of the first video; determining a first target object corresponding to the first video according to information about the degree of completion of interaction; and paying the first target object to the account of the first user and displaying a first object information window of the first target object, where a second target object corresponding to the first video is used for being paid to the account of a second user after the first video is played by the user terminal of the second user.

According to one or more embodiments of the present disclosure, in example two based on example one, after displaying the first object information window of the first target object, the method also includes receiving a sharing operation for the first video; and in response to the sharing operation, sharing the first video to the second user to enable the second target object to be paid to the account of the second user after the first video is played by the user terminal of the second user.

According to one or more embodiments of the present disclosure, in example three based on example two, before receiving the sharing operation for the first video, the method also includes receiving a sharing window display instruction, where the sharing window display instruction is generated after the first object information window is displayed for a preset duration or generated when a click on a confirmation control in the first object information window is received; and in response to the sharing window display instruction, displaying a sharing window of the first video to enable the first user to perform the sharing operation.

According to one or more embodiments of the present disclosure, in example four based on any one of examples one to three, the method also includes, in response to receiving a third target object corresponding to the first video, paying the third target object corresponding to the first video to the account of the first user and displaying a prompt message for the third target object, where the third target object is generated after the user terminal of the second user pays the second target object to the account of the second user.

According to one or more embodiments of the present disclosure, in example five based on any one of examples one to three, before receiving the video posting operation for the first video, the method also includes receiving a trigger operation on a video shooting control, where the video shooting control includes at least one of a first shooting control in a second object information window or a second shooting control in an acceptance prompt window, the second object information window is displayed after the first user accepts a fourth target object corresponding to the second video, the acceptance prompt window is displayed when an acceptance operation performed for the fourth target object by the first user is received and the unaccepted fourth target object for the second video does not exist, and the second video is posted by a user other than the first user; and in response to the trigger operation, displaying a video shooting page to enable the first user to shoot the first video on the shooting page by using the target prop.

According to one or more embodiments of the present disclosure, example six provides a video interaction method. The method includes displaying a video play page and playing a first video on the video play page, where the first video is a video shot by a first user by using a target prop and then posted by the first user, the target prop is a preset type of shooting prop, a first target object corresponding to the first video is used for being paid to the account of the first user when posting of the first video is finished, and the first target object is determined according to information about the degree of completion of interaction between the first user and the target prop in the shooting process of the first video; receiving a window display instruction for a second target object corresponding to the first video; in response to the window display instruction, displaying an acceptance window of the second target object; receiving a first trigger operation on an acceptance control in the acceptance window; and in response to the first trigger operation, paying the second target object to the account of a second user and displaying an object information window of the second target object.

According to one or more embodiments of the present disclosure, in example seven based on example six, before receiving the window display instruction for the second target object corresponding to the first video, the method also includes, in response to the first video being played to a preset node, the second target object being not paid to the account of the second user, and the unpaid second target object for the first video existing, generating a window display instruction for the second target object corresponding to the first video.

According to one or more embodiments of the present disclosure, in example eight based on example six, before receiving the window display instruction for the second target object corresponding to the first video, the method also includes, in response to receiving a second trigger operation on an object pendant of the first video, generating the window display instruction for the second target object corresponding to the first video; or in response to receiving a second trigger operation on an object pendant of the first video and in response to the first video being played to a preset node, generating the window display instruction for the second target object corresponding to the first video.

According to one or more embodiments of the present disclosure, in example nine based on example eight, before displaying the acceptance window of the second target object, the method also includes determining that the second target object is not paid to the account of the second user and that the unpaid second target object for the first video exists.

In example nine, the method also includes, in response to the second target object being paid to the account of the second user, displaying the object information window of the second target object; and in response to the second target object not being paid to the account of the second user and the unpaid second target object for the first video not existing, displaying an acceptance prompt window of the second target object to indicate to the second user that the unaccepted second target object does not exist.

According to one or more embodiments of the present disclosure, in example ten based on example nine, the method also includes receiving a third trigger operation on a video shooting control, where the video shooting control includes at least one of a first shooting control in the object information window or a second shooting control in the acceptance prompt window; and in response to the third trigger operation, displaying a video shooting page to enable the second user to shoot a second video on the shooting page by using the preset type of shooting prop and then post the second video.

According to one or more embodiments of the present disclosure, example eleven provides a video interaction apparatus. The apparatus includes a receiving module, a video posting module, an information acquisition module, an object determination module, and a payment module.

The receiving module is configured to receive a video posting operation for a first video, where the first video is a video shot by a first user by using a target prop, where the target prop is a preset type of shooting prop.

The video posting module is configured to, in response to the video posting operation, post the first video.

The information acquisition module is configured to, in response to finishing posting the first video, acquire information about the degree of completion of interaction between the first user and the target prop in the shooting process of the first video.

The object determination module is configured to determine a first target object corresponding to the first video according to information about the degree of completion of interaction.

The payment module is configured to pay the first target object to the account of the first user and display a first object information window of the first target object, where a second target object corresponding to the first video is used for being paid to the account of a second user after the first video is played by the user terminal of the second user.

According to one or more embodiments of the present disclosure, example twelve provides a video interaction apparatus. The apparatus includes a video play module, an instruction receiving module, an acceptance window display module, a receiving module, and a payment module.

The video play module is configured to display a video play page and play a first video on the video play page, where the first video is a video shot by a first user by using a target prop and then posted by the first user, the target prop is a preset type of shooting prop, a first target object corresponding to the first video is used for being paid to the account of the first user when posting of the first video is finished, and the first target object is determined according to information about the degree of completion of interaction between the first user and the target prop in the shooting process of the first video.

The instruction receiving module is configured to receive a window display instruction for a second target object corresponding to the first video.

The acceptance window display module is configured to, in response to the window display instruction, display an acceptance window of the second target object.

The receiving module is configured to receive a first trigger operation on an acceptance control in the acceptance window.

The payment module is configured to, in response to the first trigger operation, pay the second target object to the account of a second user and display an object information window of the second target object.

According to one or more embodiments of the present disclosure, example thirteen provides an electronic device. The electronic device includes at least one processor and a memory configured to store at least one program.

The at least one processor is configured to perform the video interaction method of any one of examples one to ten when executing the at least one program.

According to one or more embodiments of the present disclosure, example fourteen provides a computer-readable storage medium. The storage medium stores a computer program which, when executed by a processor, causes the processor to perform the video interaction method of any one of examples one to ten.

Additionally, although multiple operations are described in a particular order, it is not a must to perform these operations in this particular order or in sequential order. In a certain environment, multitasking and parallel processing may be advantageous. Similarly, although multiple implementation details are included in the preceding discussion, these should not be construed as limiting the scope of the present disclosure. Some features described in the context of separate embodiments may be implemented in combination in a single embodiment. Rather, features described in the context of a single embodiment may be implemented in multiple embodiments individually or in any suitable sub-combination.

What is claimed is:

1. A video interaction method, comprising:
receiving a video posting operation for a first video, wherein the first video is a video shot by a first user by using a target prop, wherein the target prop is a preset type of shooting prop, wherein the shooting prop is a virtual environment for video shooting;
in response to the video posting operation, posting the first video;

in response to finishing posting the first video, acquiring information about a degree of completion of interaction between the first user and the target prop in a shooting process of the first video;

determining a first target object corresponding to the first video according to the information about the degree of completion of interaction; and paying the first target object to an account of the first user and displaying a first object information window of the first target object, wherein the posted first video is playable by a user terminal of a second user;

wherein before receiving the video posting operation for the first video, the method further comprising:

receiving a first trigger operation on a video shooting control, wherein the video shooting control comprises at least one of a first shooting control in a second object information window or a second shooting control in an acceptance prompt window, the second object information window is displayed after the first user accepts a fourth target object corresponding to a second video, the acceptance prompt window is displayed when an acceptance operation performed for the fourth target object by the first user is received and an unaccepted fourth target object for the second video does not exist, and the second video is posted by a user other than the first user; and in response to the first trigger operation, displaying a video shooting page to enable the first user to shoot the first video on the shooting page by using the target prop.

2. The method of claim 1, after displaying the first object information window of the first target object, the method further comprising:

receiving a sharing operation for the first video; and in response to the sharing operation, sharing the first video to the second user to enable a second target object to be paid to an account of the second user after the first video is played by the user terminal of the second user.

3. The method of claim 2, before receiving the sharing operation for the first video, the method further comprising:

receiving a sharing window display instruction, wherein the sharing window display instruction is generated after the first object information window is displayed for a preset duration or generated when a click on a confirmation control in the first object information window is received; and in response to the sharing window display instruction, displaying a sharing window of the first video to enable the first user to perform the sharing operation.

4. The method of claim 3, further comprising:

in response to receiving a third target object corresponding to the first video, paying the third target object corresponding to the first video to the account of the first user and displaying a prompt message for the third target object, wherein the third target object is generated after the user terminal of the second user pays the second target object to the account of the second user.

5. The method of claim 2, further comprising:

in response to receiving a third target object corresponding to the first video, paying the third target object corresponding to the first video to the account of the first user and displaying a prompt message for the third target object, wherein the third target object is generated after the user terminal of the second user pays the second target object to the account of the second user.

6. The method of claim 1, further comprising:

in response to receiving a third target object corresponding to the first video, paying the third target object corresponding to the first video to the account of the first user and displaying a prompt message for the third target object, wherein the third target object is generated after the user terminal of the second user pays a second target object to an account of the second user.

7. A non-transitory computer-readable storage medium storing a computer program which, when executed by a processor, causes the processor to perform the video interaction method of claim 1.

8. A video interaction method, comprising:

displaying a video play page and playing a first video on the video play page, wherein the first video is a video shot by a first user by using a target prop in response to a first trigger operation on a video shooting control and then posted by the first user, the target prop is a preset type of shooting prop, the shooting prop is a virtual environment for video shooting, a first target object corresponding to the first video is used for being paid to an account of the first user when posting of the first video is finished, the first target object is determined according to information about a degree of completion of interaction between the first user and the target prop in a shooting process of the first video, and the posted first video is playable by a user terminal of a second user, and wherein the video shooting control comprises at least one of a first shooting control in a second object information window or a second shooting control in an acceptance prompt window, the second object information window is displayed after the first user accepts a fourth target object corresponding to a second video, the acceptance prompt window is displayed when an acceptance operation performed for the fourth target object by the first user is received and an unaccepted fourth target object for the second video does not exist.

9. The method of claim 8, before receiving the window display instruction for a second target object corresponding to the first video, the method further comprising:

in response to the first video being played to a preset node, the second target object being not paid to an account of the second user, and an unpaid second target object for the first video existing, generating the window display instruction for the second target object corresponding to the first video.

10. The method of claim 8, before receiving the window display instruction for a second target object corresponding to the first video, the method further comprising:

in response to receiving a second trigger operation on an object widget of the first video, generating the window display instruction for the second target object corresponding to the first video; or in response to receiving a second trigger operation on an object widget of the first video and in response to the first video being played to a preset node, generating the window display instruction for the second target object corresponding to the first video.

11. The method of claim 10, before displaying the acceptance window of the second target object, the method further comprising:

determining that the second target object is not paid to the account of the second user and that an unpaid second target object for the first video exists; and the method further comprising:
in response to the second target object being paid to the account of the second user, displaying the object information window of the second target object; and
in response to the second target object not being paid to the account of the second user and the unpaid second target object for the first video not existing, displaying an acceptance prompt window of the second target object to indicate to the second user that an unaccepted second target object does not exist.

12. The method of claim 11, further comprising:
receiving a third trigger operation on a video shooting control, wherein the video shooting control comprises at least one of a first shooting control in the object information window or a second shooting control in the acceptance prompt window; and
in response to the third trigger operation, displaying a video shooting page to enable the second user to shoot the second video on the shooting page by using the preset type of shooting prop and then post the second video.

13. An electronic device, comprising:
at least one processor; and
a memory configured to store at least one program,
wherein the at least one processor is configured to, when executing the at least one program, perform the video interaction method of claim 8.

14. A non-transitory computer-readable storage medium storing a computer program which, when executed by a processor, causes the processor to perform the video interaction method of claim 8.

15. An electronic device, comprising:
at least one processor; and
a memory configured to store at least one program,
wherein the at least one processor is configured to, when executing the at least one program, perform the following steps:
receiving a video posting operation for a first video, wherein the first video is a video shot by a first user by using a target prop, the target prop is a preset type of shooting prop, and the shooting prop is a virtual environment for video shooting;
in response to the video posting operation, posting the first video;
in response to finishing posting the first video, acquiring information about a degree of completion of interaction between the first user and the target prop in a shooting process of the first video;
determining a first target object corresponding to the first video according to the information about the degree of completion of interaction; and
paying the first target object to an account of the first user and displaying a first object information window of the first target object, wherein the posted first video is playable by a user terminal of a second user;
wherein before receiving the video posting operation for the first video, the at least one processor is further configured to perform the following steps:
receiving a first trigger operation on a video shooting control, wherein the video shooting control comprises at least one of a first shooting control in a second object information window or a second shooting control in an acceptance prompt window, the second object information window is displayed after the first user accepts a fourth target object corresponding to a second video, the acceptance prompt window is displayed when an acceptance operation performed for the fourth target object by the first user is received and an unaccepted fourth target object for the second video does not exist, and the second video is posted by a user other than the first user; and
in response to the first trigger operation, displaying a video shooting page to enable the first user to shoot the first video on the shooting page by using the target prop.

16. The device of claim 15, wherein the at least one processor is further configured to perform, after displaying the first object information window of the first target object, the following steps:
receiving a sharing operation for the first video; and
in response to the sharing operation, sharing the first video to the second user to enable a second target object to be paid to an account of the second user after the first video is played by the user terminal of the second user.

17. The device of claim 16, wherein the at least one processor is further configured to perform, before receiving the sharing operation for the first video, the following steps:
receiving a sharing window display instruction, wherein the sharing window display instruction is generated after the first object information window is displayed for a preset duration or generated when a click on a confirmation control in the first object information window is received; and
in response to the sharing window display instruction, displaying a sharing window of the first video to enable the first user to perform the sharing operation.

* * * * *